(12) United States Patent
Dautartas et al.

(10) Patent No.: US 6,582,548 B1
(45) Date of Patent: Jun. 24, 2003

(54) COMPRESSION BONDING METHOD USING LASER ASSISTED HEATING

(75) Inventors: Mindaugas Fernand Dautartas, Blacksburg, VA (US); Frank Stephen Walters, Kutztown, PA (US)

(73) Assignee: TriQuint Technology Holding Co., Hillsboro, OR (US)

( * ) Notice: Subject to any disclaimer, the term of this patent is extended or adjusted under 35 U.S.C. 154(b) by 149 days.

(21) Appl. No.: 09/628,063

(22) Filed: Jul. 28, 2000

(51) Int. Cl.[7] ............................................. B23K 26/20
(52) U.S. Cl. ............................... 156/272.8; 219/121.64; 228/903
(58) Field of Search ........................... 156/272.2, 272.8, 156/273.7; 228/234.1, 903, 228; 219/121.6, 121.63, 121.64; 428/630, 650

(56) References Cited

U.S. PATENT DOCUMENTS

| 4,534,811 A | * | 8/1985 | Ainslie et al. ........... 156/272.8 |
| 5,178,319 A | | 1/1993 | Coucoulas ................ 228/234 |
| 5,337,383 A | | 8/1994 | DeAngelis et al. .......... 385/49 |

FOREIGN PATENT DOCUMENTS

| EP | 0 262 699 | 4/1988 | ........... B23K/26/18 |
| EP | 2 326 366 | 12/1998 | ........... B23K/26/00 |

OTHER PUBLICATIONS

European Search Report, Sep. 6, 2001, with references as indicated above.

\* cited by examiner

Primary Examiner—Michael W. Ball
Assistant Examiner—John T. Haran
(74) Attorney, Agent, or Firm—Lester H. Birnbaum

(57) ABSTRACT

A method for bonding an oxide-containing member to an aluminum surface, includes the steps of: providing a substrate, wherein a portion of a surface of the substrate has aluminum thereon; positioning an oxide-containing member on the aluminum surface of the substrate; and bonding the oxide-containing member to the aluminum surface by pressing the oxide-containing member against the aluminum surface while simultaneously heating the interface between the oxide-containing member and the aluminum surface. The interface between the oxide-containing member and the aluminum surface is heated with a laser.

12 Claims, 6 Drawing Sheets

COMPRESSION BONDING METHOD USING LASER ASSISTED HEATING

FIELD OF THE INVENTION

This invention relates to compression bonding methods, and more particularly to methods for bonding optical elements such as glass optical fibers and glass lenses to aluminum.

BACKGROUND OF THE RELATED ART

Optical communication systems typically include a variety of optoelectronic devices (e.g., light sources, photodetectors, switches, modulators, amplifiers, and filters). For example, in the optical communication system 1 shown in FIG. 1, a light source 2 generates an optical signal. The optical signal comprises a series of light pulses. The light pulses are transmitted from the light source 2 to a detector 5. Typically, an optical fiber 4 transmits the light pulses from the light source 2 to the detector 5. The optical fiber 4 preferably has amplifiers (not shown) and filters (not shown) positioned along its length. The amplifiers and filters propagate the light pulses along the length of the optical fiber 4 from the light source 2 to the detector 5.

The light pulses propagated from the light source 2 to the detector 5 are typically coupled from the optical fiber 4 to the optoelectronic devices (or vice versa) with an optoelectronic module. A schematic view of an optoelectronic module 6 useful for coupling light pulses from an optical fiber to an optoelectronic device is shown in FIG. 2.

The optoelectronic module 6 includes a support 7, a lens 8, an optical fiber 9, and an optoelectronic device 10. The lens 8 couples the light between the optical fiber 9 and the optoelectronic device 10.

The lens 8 and the optical fiber 9 are typically made of glass. The support 7 is typically made of silicon. Silicon etches preferentially along predictable crystallographic planes, so grooves, cavities, and alignment indentations suitable for supporting the lens 8 and/or the optical fiber 9 are easily formed by masking and etching various surfaces of the silicon support. The lens 8, the optical fiber 9, and the optoelectronic device 10 are preferably bonded to the support 7. The optoelectronic device is typically soldered to the support. In one technique, the lens and/or the optical fiber is bonded to the support with an adhesive such as an epoxy. However, epoxies potentially provide a source of contamination for the optoelectronic module. For example, epoxies typically outgas solvents, which will not allow hermetic sealing of the optoelectronic package. Furthermore these solvents can be absorbed by the facet coating of the optoelectronic device leading to eventual failure of the coating and device.

Alternatively, the lens and/or optical fiber are bonded on the support using thermo-compression bonding, as shown in FIG. 3. In thermo-compression bonding, the grooves and cavities used to support the lens or the optical fiber are coated with a layer of aluminum 11. Thereafter, the lens and/or the optical fiber are bonded to the aluminum surfaces of the support by applying pressure 12 and heat 13 to the interface between the lens and/or the optical fiber and the aluminum layer. For example, a force greater than about 1000 grams applied for more than 30 seconds at a temperature between about 350° C. to about 400° C. is typically required to bond a glass lens to an aluminum coated silicon support.

Heating the support at temperatures between about 350° C. to about 400° C. for times greater than 30 seconds potentially affects the solder bonds used to bond the optoelectronic device to the support. For example, AuSn is typically used to bond optoelectronic devices to the silicon support. AuSn flows at a temperature of about 285–330° C., so optoelectronic devices attached therewith potentially move as the solder attaching them reflows. Additionally, many lenses are coated with an antireflective (AR) coating. The AR coatings reduce reflections off of surfaces at a wavelength determined by the properties of the coating. Forces greater than about 1000 grams potentially fracture the AR coatings on the lenses, causing some bonds (about 5–10%) to have low bond strengths.

SUMMARY OF THE INVENTION

A method for bonding an oxide-containing member to an aluminum surface, comprising the steps of: providing a substrate, wherein a portion of a surface of the substrate has aluminum thereon; positioning an oxide-containing member on the aluminum surface of the substrate; and bonding the oxide-containing member to the aluminum surface by pressing the oxide-containing member against the aluminum surface while simultaneously heating the interface between the oxide-containing member and the aluminum surface, wherein the interface between the oxide-containing member and the aluminum surface is heated with a laser.

Desirably, the interface can be heated by a resistive heater to a temperature below the melting point of the solders of the assembly and localized heating via the laser light can be used to reach the final temperature for bonding without affecting the solder bonds already in place on the substrate.

BRIEF DESCRIPTION OF THE DRAWING

Other objects or features of the present invention will become apparent from the following detailed description considered in conjunction with the accompanying drawings. It is to be understood, however, that the drawings are designed solely for purposes of illustration and do not serve to limit the invention, for which reference should be made to the appended claims.

In the drawing.

DETAILED DESCRIPTION

Figure 4:
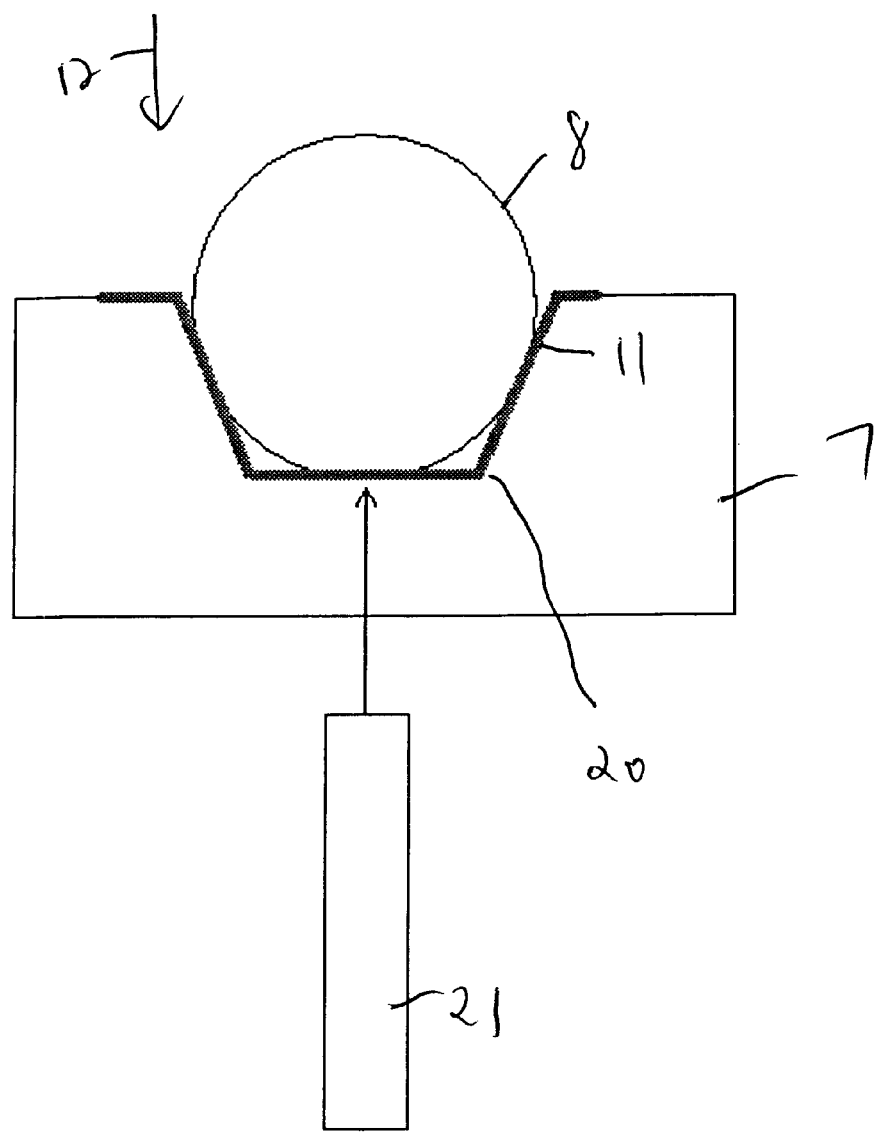
FIG. 4 is a schematic illustration of laser heating of an optoelectronic device in accordance with an embodiment of the invention.

As illustrated in FIG. 4, a substrate, 7, is provided. The substrate is made of a material suitable for making an optoelectronic module such as silicon. The surface of the substrate optionally includes V-grooves, e.g., 20, in which components can be mounted.

At least a portion of the surface of the substrate, in this example the walls and bottom of the V-groove, has a layer of aluminum, 11, thereon. The layer of aluminum preferably has a thickness greater than about 2 μm.

An oxide-containing member, in this example a lens 8, is positioned on the aluminum surface of the substrate. The oxide-containing member is preferably made predominantly of silicon dioxide. Suitable examples of the member include glass lenses and glass optical fibers.

Thereafter, the oxide-containing member is pressed against the aluminum surface of the substrate with a force, 12, sufficient to hold it thereto. Forces of about 0.5 Kg to about 1 Kg are sufficient to hold the oxide-containing member against the aluminum surface of the substrate.

As the oxide-containing member is pressed against the aluminum surface of the substrate, a beam from a laser, 21, is directed at the interface between the oxide-containing member and the aluminum surface. Directing the laser beam at the interface between the oxide-containing member and the aluminum surface bonds the oxide-containing member thereto. The laser is directed onto the interface between the oxide-containing member and the aluminum surface preferably by focusing the laser beam through the substrate, as shown in FIG. 4. This arrangement is preferable when using a YAG laser, with a wavelength of 1060 nm, on silicon substrates, which are transparent at wavelengths above 900 nm.

Figure 5:
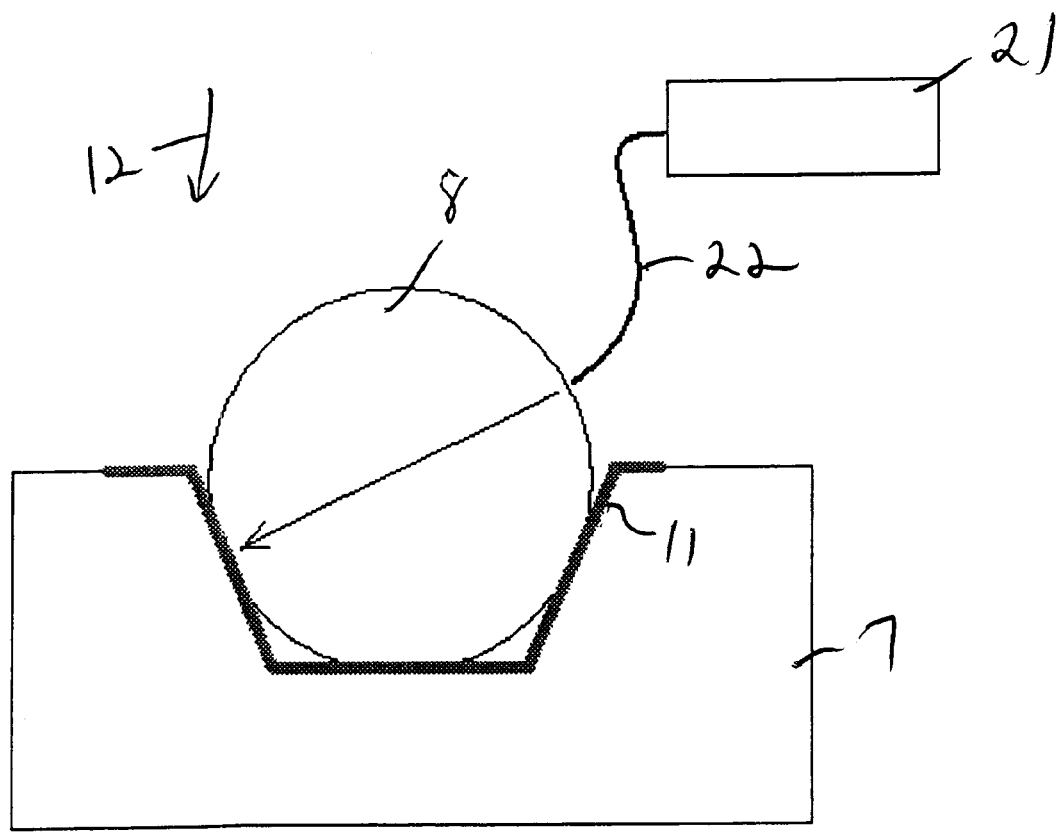
FIG. 5 is a schematic illustration of laser heating of an optoelectronic device in accordance with an alternative embodiment of the invention.

Alternatively, the laser is directed at the interface between the oxide-containing member and the aluminum surface via a side angle or from the top as shown in FIG. 5. In this embodiment, the laser light is directed at the interface using an optical fiber, 22. This arrangement is preferable for lasers with a wavelength of less than 900 nm for example, solid state diode fiber lasers operating at 804 nm.

The laser is preferably operated at an output power of less than about 5 Watts and with a beam width of 1 mm, focused to 2 μm. Such a laser output power and beam width is sufficient to heat only the interface between the oxide-containing member and the aluminum surface without affecting other areas of the substrate surface. The laser is preferably operated using a pulsed-mode. In the pulsed-mode, the laser periodically emits light pulses. The light pulses are emitted at a frequency of about 1 Khz.

If desired, the entire module can be heated initially by standard methods, such as a resistive heater, to a temperature below the melting temperature of solder used to mount the other components to the substrate. Localized laser heating could then be employed as described herein to raise only the localized aluminum layer to a temperature suitable for bonding the oxide member to the aluminum layer.

Figure 1:
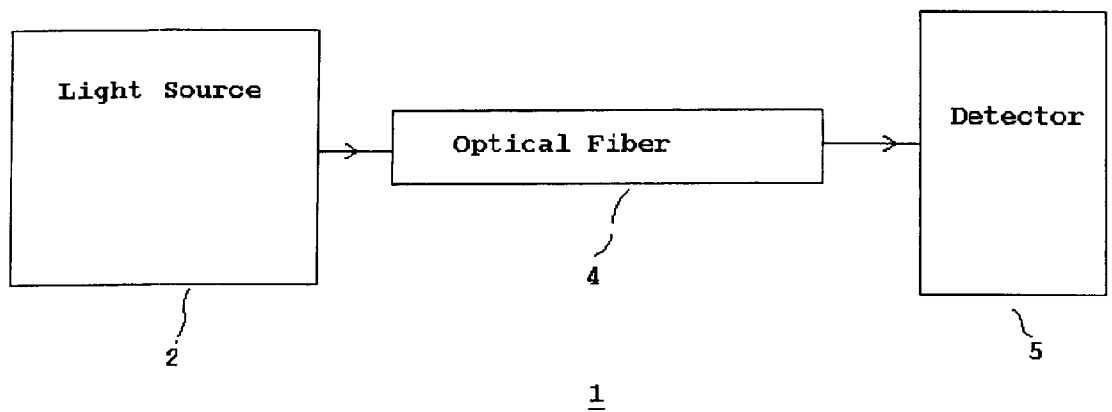
FIG. 1 is block diagram of a portion of a typical optical communication system which may utilize the invention.
Figure 2:
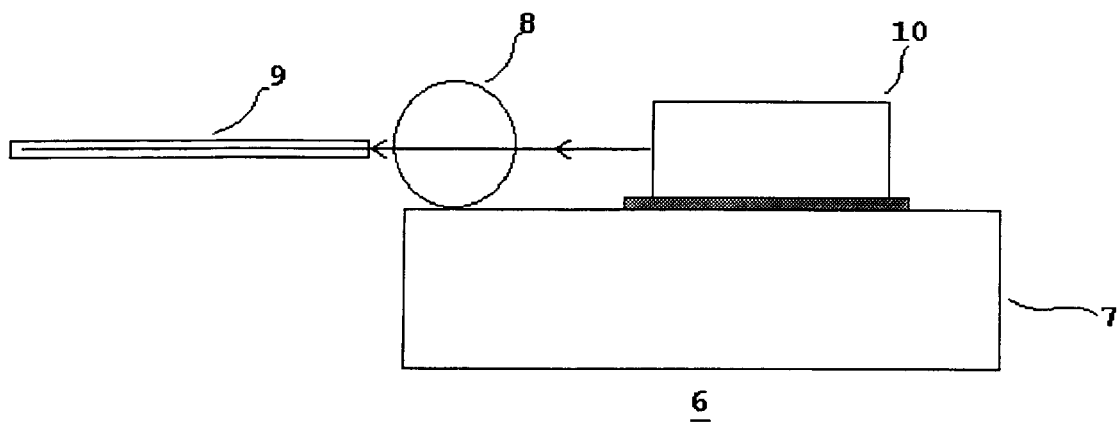
FIG. 2 is a schematic view of a typical optoelectronic device which may utilize the invention.
Figure 3:
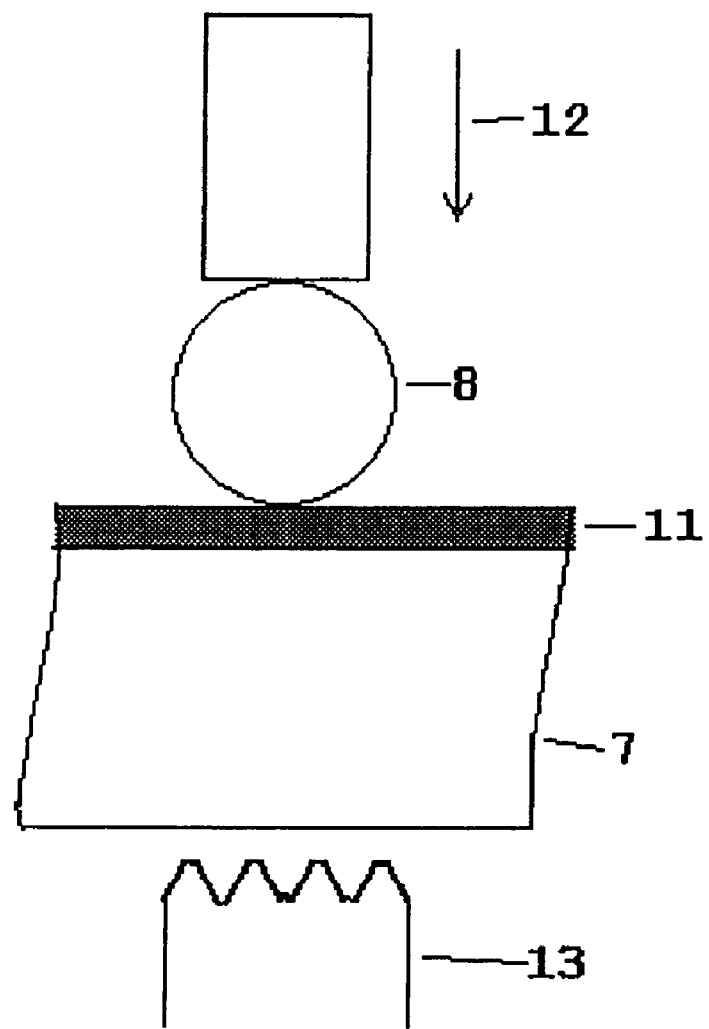
FIG. 3 is a schematic illustration of a thermo-compression bonding process.
Figure 6:
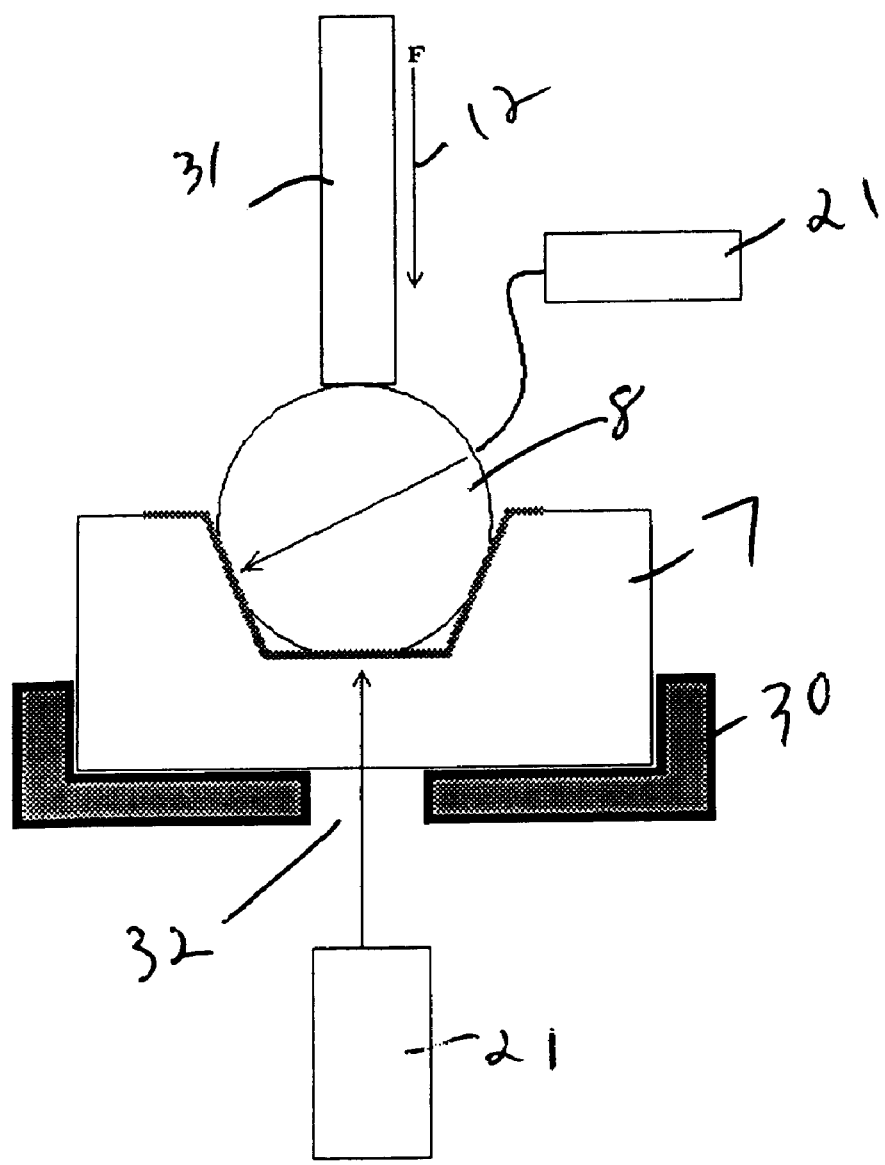
FIG. 6 is a schematic illustration of an apparatus which may be used to practice the present invention with one embodiment.

FIG. 6 shows a modified thermo-compression bonder which may be utilized to practice the invention. The standard bonder consists of the collet, 30, used to position and hold the substrate, 7, and a resistive heater (13 of FIG. 3) used to raise the temperature of the assembly. The upper collet, 31, applies pressure, 12, to the oxide member, 8. An ultrasonic transducer, not shown, may be used to assist in applying pressure during the bonding process. Modification to the collet, 30, includes a hole, 32, in the bottom to accommodate an optical path through the substrate for bonding. Alternatively, a fiber laser is positioned at an angle consistent with focusing the beam through the oxide member to heat the bonding surface.

The invention claimed is:

1. A method for bonding an oxide-containing member to an aluminum surface, comprising the steps of: providing a substrate, wherein a portion of a surface of the substrate has aluminum thereon; positioning an oxide-containing member on the aluminum surface of the substrate; and bonding the oxide-containing member to the aluminum surface by pressing the oxide-containing member against the aluminum surface while simultaneously heating the interface between the oxide-containing member and the aluminum surface, wherein the interface between the oxide-containing member and the aluminum surface is heated with a laser.

2. The method of claim 1 wherein the oxide-containing member is made predominantly of silicon dioxide.

3. The method of claim 2 wherein the oxide-containing member is a glass optical fiber.

4. The method of claim 2 wherein the oxide-containing member is a glass lens.

5. The method of claim 1 wherein the aluminum surface has a V-shaped indentation and the oxide-containing member is bonded to the V-shaped indentation.

6. The method of claim 1 wherein the aluminum surface is substantially flat.

7. The method of claim 1 wherein the laser is operated in the pulsed mode.

8. The method of claim 1 wherein the laser has a beam diameter of approximately 1 mm.

9. The method of claim 1 wherein the laser is a YAG laser.

10. The method according to claim 1 wherein the entire surface of the substrate is first heated to a desired temperature, and then the interface between the oxide containing component and the aluminum is locally heated by the laser to a higher temperature.

11. The method according to claim 1 wherein light from the laser is directed through the substrate.

12. The method according to claim 1 wherein light from the laser is directed through the oxide containing component.

\* \* \* \* \*